United States Patent [19]

Kojima

[11] Patent Number: 4,673,419
[45] Date of Patent: Jun. 16, 1987

[54] AIR DRYER DEVICE

[75] Inventor: Katsumi Kojima, Yokosuka, Japan

[73] Assignee: Nippon Air Brake Co., Ltd., Japan

[21] Appl. No.: 899,070

[22] Filed: Aug. 21, 1986

[30] Foreign Application Priority Data

Sep. 5, 1985 [JP] Japan .................. 60-135938[U]

[51] Int. Cl.⁴ .............................................. B01D 53/04
[52] U.S. Cl. ....................................... 55/163; 55/218;
55/387; 55/DIG. 17
[58] Field of Search ................. 55/163, 218, 316, 387,
55/389, DIG. 17

[56] References Cited

U.S. PATENT DOCUMENTS

| | | | |
|---|---|---|---|
| 2,381,354 | 8/1945 | Larson | 55/316 X |
| 3,347,387 | 10/1967 | Balogh | 55/316 X |
| 3,353,339 | 11/1967 | Walter | 55/316 |
| 3,464,186 | 9/1969 | Hankison et al. | 55/163 |
| 3,472,000 | 10/1969 | Glass et al. | 55/163 |
| 3,705,480 | 12/1972 | Wireman | 55/316 X |
| 4,026,685 | 5/1977 | Grix | 55/218 X |
| 4,071,337 | 1/1978 | Evans | 55/316 X |
| 4,108,617 | 8/1978 | Frantz | 55/DIG. 17 |
| 4,131,442 | 12/1978 | Frantz | 55/316 X |
| 4,361,425 | 11/1982 | Hata | 55/218 |
| 4,487,617 | 12/1984 | Dienes et al. | 55/DIG. 17 |
| 4,496,376 | 1/1985 | Hradek | 55/163 |
| 4,544,385 | 10/1985 | Tanaka | 55/218 X |
| 4,572,725 | 2/1986 | Kojima | 55/316 X |
| 4,581,047 | 4/1986 | Larrsson | 55/387 X |

FOREIGN PATENT DOCUMENTS

| 25527 | 2/1985 | Japan | 55/163 |
|---|---|---|---|
| 64616 | 4/1985 | Japan | 55/163 |

Primary Examiner—Robert Spitzer
Attorney, Agent, or Firm—Kane, Dalsimer, Kane, Sullivan and Kurucz

[57] ABSTRACT

An air dryer device for drying compressed air includes a base member, a housing mounted on the base member, and an air dryer disposed within the housing. The air dryer includes an absorbent container of a synthetic resin holding an absorbent material and disposed in spaced relation to the housing to form a space therebetween. The base member has an inlet, an outlet and a passage. The compressed air applied to the inlet flows through the passage, the container, the space to the outlet. The container has a peripheral flange at a lower end thereof. A lower end wall of the container and the flange defining a bottom of the container. A plate is embedded in the bottom of the container. Fastening elements pass through the flange and the plate into the base member to fasten the container to the base member.

6 Claims, 2 Drawing Figures

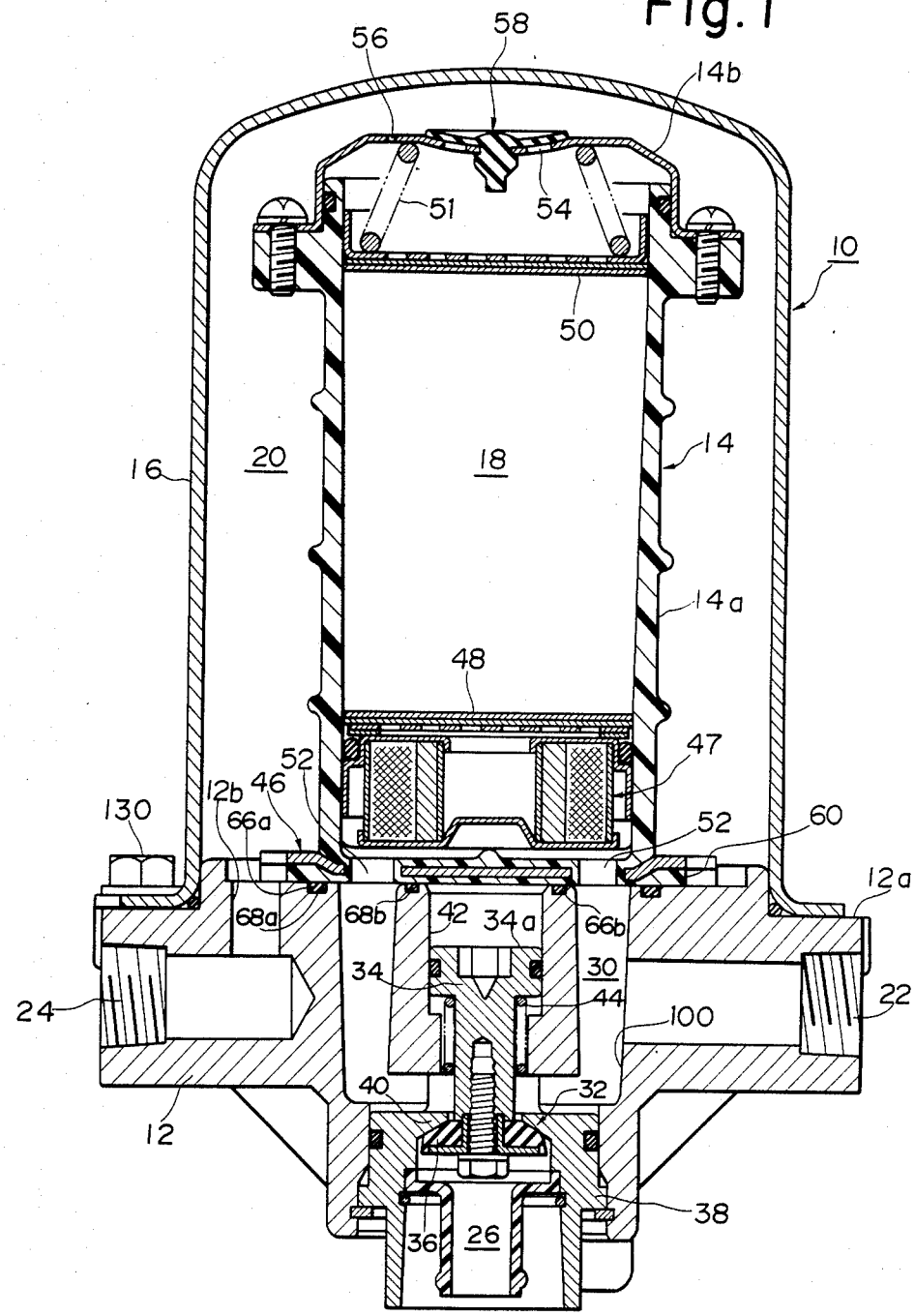

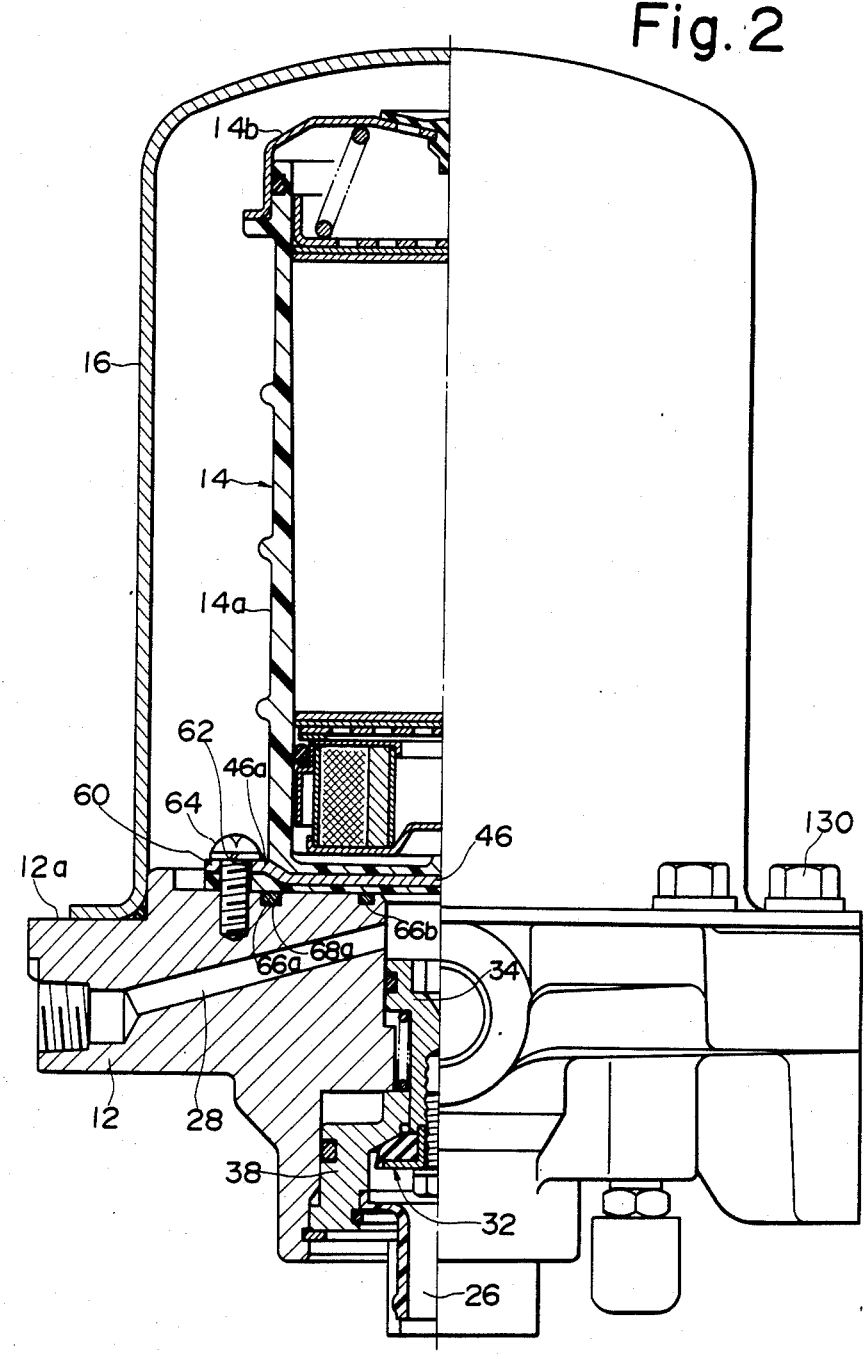

AIR DRYER DEVICE

BACKGROUND OF THE INVENTION

1. Field of the Invention

This invention relates to an air dryer device for drying compressed air of compressed air system, such as an air brake for a vehicle.

2. Prior Art

One conventional air dryer device as shown in U.S. Pat. No. 4,487,617 comprises a base member, a cylindrical housing mounted on the base member, an absorbent container mounted on the base member and accommodated within the housing in concentric relation thereto to form a closed space or purge chamber therebetween for storing compressed air for regenerating the absorbent material in the absorbent container. The base member has an air inlet connected to a source of compressed air, an upwardly-opening hollow portion, and an upwardly opening cavity. A plate is interposed between the base member and the housing and hence between the base member and the absorbent container. The plate covers the hollow portion to provide a valve housing in which a drain valve is accommodated. The plate also covers the cavity to provide an air passage through which the air inlet communicates with the interior of the absorbent container. With the use of the plate, the valve housing and the air passage can be provided relatively easily with a less complicated construction of the base member. A seal member is interposed between the plate and the base member. The plate is secured at its marginal portion to the base member by bolts together with the housing. It has been found that when the plate is warped or deformed upwardly toward the housing due to a pressure differential between the purge chamber and the air passage, the seal member fails to properly seal between the plate and the base member.

SUMMARY OF THE INVENTION

With the above deficiencies in view, it is therefore an object of this invention to provide an air dryer device which ensures a positive seal between a base member and a plate mounted on it without increasing component parts.

According to the present invention, there is provided an air dryer device for drying compressed air which comprises:

(a) a base member having an upper surface, an air inlet connectable to a cource of compressed air, an air outlet connectable to an air tank, and a cavity communicating with said air inlet and having an upper end opening to said upper surface;

(b) a housing mounted on said base member at a lower end thereof;

(c) a drain passage provided in said base member and communicating to the ambient atmosphere;

(d) a drain valve mounted on said base member for selectively communicating said cavity with said drain passage;

(e) an air dryer disposed within said housing, said air dryer including an absorbent container of a synthetic resin holding an absorbent material and disposed in spaced relation to said housing to form a space therebetween which communicates with said air outlet of said base member, said container having a lower end wall seated on said upper surface of said base member to close said open upper end of said cavity, said container having a peripheral flange at a lower end thereof, said lower end wall and said flange defining a bottom of said container, said container having an air passage for communicating the interior of said container with said space, said container being provided with a check valve mounted in said air passage for allowing a flow of the air from the interior of said container to said space but preventing a flow of the air from said space to the interior of said container, and said container having a throttle passage for allowing the air to flow from said space to the interior of said container to regenerate the absorbent material therein;

(f) a plate embedded in said bottom of said container, another air passage being formed through said bottom to communicate said cavity with the interior of said container, (g) fastening elements passing through said flange and said plate into said base member to fasten said container to said base member.

BRIEF DESCRIPTION OF THE DRAWINGS

FIG. 1 is a cross-sectional view of an air dryer device provided in accordance with the present invention; and FIG. 2 is a partial cross-sectional view of the air dryer device, displaced through 90 degrees about an axis thereof.

DESCRIPTION OF THE PREFERRED EMBODIMENT OF THE INVENTION

An air dryer device 10 shown in FIGS. 1 and 2 comprises a base member 12 of a circular shape, a cylindrical housing 16 having an open bottom and mounted on the base member 12, and an air dryer 14 mounted within the housing 16. The air dryer 14 includes an absorbent container 14a of a tubular shape mounted on the base member 12 within the housing 16 in concentric relation thereto to form a space 20 therebetween. An absorbent material is filled in the interior 18 of the absorbent container 14a. The space 20 serves as a purge space for storing compressed air for regenerating the absorbent material in the absorbent container 14a. The housing 16 is made of metal so as to withstand a pressure differential between the interior and exterior thereof while the absorbent container 14a is made of a synthetic resin such as polypropylene, 6-nylon, glass fiber-reinforced polypropylene and glass fiber-reinforced 6-nylon. The base member 12 is recessed at a marginal portion of an upper surface thereof to form an annular recess 12a. A flanged lower end of the housing 16 is seated on the recess 12a and secured thereto by bolts 130, so that the overall height of the air dryer device 10 is reduced.

The base member 12 has an air inlet 22 for being connected to a source of compressed air (not shown), an air outlet 24 communicated with the space 20 through a port 12b and connected to an air tank (not shown), a drain passage 26 for discharging a drain liquid, a control air passage 28 for supplying a pneumatic signal to a drain valve 32 for controlling an operation thereof. The base member 12 has a central hollow portion 100 formed therethrough and a tubular portion 42 disposed within the hollow portion 100 coaxially to form a cavity 30 therebetween. The cavity 30 and the tubular portion 42 open to an upper surface of the base member 12. The air inlet 22 communicates with the cavity 30, and a hollow plug member 38 is fitted in a lower portion of the hollow portion 100.

The drain valve 32 includes a piston 34 movable along an axis of the base member 12, and an upper portion of the piston 34 is slidably received in the tubular portion 42. A valve member 36 of rubber is secured to the lower end of the piston 34 and received in the hollow plug member 38. A coil spring 44 is received in the tubular portion 42 to normally urge the piston 34 upwardly to hold the valve member 36 in sealing engagement with a valve seat 40 formed on an upper portion of the plug member 38. The pneumatic signal in the form of compressed air is selectively supplied from an external air pressure governor through the control air passage 28 to the interior of the tubular portion 42 so as to act on a head 34a of the piston 34, so that the piston 34 is urged downwardly against the bias of the coil spring 44 to disengage the valve member 36 from the valve seat 40 to open the drain valve 32, thereby communicating the cavity 30 with the drain passage 26.

The absorbent container 14a of a synthetic resin has a lower end wall and an upper open end, and a cap member 14b is attached to the upper open end of the absorbent container 14a to close it. The lower end of the absorbent container 14a closes the upper open ends of the cavity 30 and tubular portion 42. Also, the absorbent container 14a has a peripheral flange 60 formed therearound at the lower end thereof. A circular plate member 46 of metal is embedded in the lower end wall of the absorbent container 14a. A filter device 47 for arresting foreign matters such as oil is mounted within the absorbent container 14a at the lower portion thereof. A lower air-permeable partition member 48 is placed on the filter device 47, and an upper air-permeable partition member 50 is also mounted within the absorbent container 14a. The absorbent material (not shown) in the form of granules is filled in a space defined by the side wall of the absorbent container 14a and the upper and lower partition members 48 and 50. A coil spring 51 acts between the cap member 14b and the upper partition member 50 to hold the granular absorbent material against movement.

The side or peripheral wall of absorbent container 14a has a uniform outer diameter throughout an entire length thereof while the inner diameter of the absorbent container 14a is tapering in diameter progressively toward the upper end thereof, so that the thickness of the side wall becomes greater progressively toward the lower end of the absorbent container 14a. With this configuration, the strength of the absorbent container 14a is increased. In addition, this facilitates the removal of the molded absorbent container 14a from a mold. Further, the filter device 47 and the partition plates 48 and 40 can be easily introduced into the absorbent container when assembling the dryer 14.

The absorbent container 14a has a first passage 52 formed through the lower end wall thereof for communicating the cavity 30 with the interior 18 of the absorbent container 14a. A second passage 54 and a throttle passage 56 of a smaller size are formed through the cap member 14b so as to communicate the interior 18 of the absorbent container 14 with the purge space 20. The dried air is delivered from the interior 18 of the absorbent container 14 to the purge space 20 through the second passage 54. A check valve 58 provided in the second passage 54 to allow the air to flow from the interior 18 to the purge space 20 but prevents the flow of the air from the purge space 20 to the interior 18. The throttle passage 56 allows the air to flow from the purge space 20 to the interior 18 to regenerate the absorbent material therein.

The circular plate 46 of metal has a marginal portion 46a raised so that the plate has a dish-like shape. The plate 46 is embedded in the lower end wall of the absorbent container 14a as described above, and the marginal portion 46a of the plate 46 is disposed on the upper surface of the peripheral flange 60 of the absorbent container 14a. Thus, the bottom of the absorbent container 14a defined by the lower end wall and the peripheral flange 60 is reinforced by the metal plate 46, with the marginal portion 46a exposed. A plurality of apertures 62 are formed through the marginal portion 46a of the plate 46 and the peripheral flange 60 of the absorbent container 14a. The absorbent container 14a is fixedly secured to the upper surface of the base member 12 by a plurality of screws 64 passing through the respective apertures 62 into the base member 12. Therefore, the head of each screws 64 are held against the upper surface of the marginal portion 46a of the plate 46, so that the absorbent container 14a of a synthetic resin is firmly secured to the base member 12.

A seal ring 66a is received in an annular groove 68a formed in the upper surface of the base member 12 in surrounding relation thereto, and another seal ring 66b is received in an annular groove 68b formed in the upper surface of the tubular portion 42. The plate 46 has a relatively smaller diameter since it is designed to be disposed within the housing 16. And, the absorbent container 14a has the raised marginal portion 46a, so that the plate 46 has an increased rigidity. In addition, the plate 46 is embedded in the bottom of the absorbent container 14a. Therefore, the plate 46 is hardly subjected to warp or deformation due to a pressure differential therebetween as is the case with the conventional air dryer device. This ensures the proper function of the seal rings 66a and 66b.

While the air dryer device according to the present invention has been specifically shown and described herein, the invention itself is not to be restricted by the exact showing of the drawings or the description thereof. For example, the peripheral flange may be interrupted by a plurality of notches formed therethrough in circumferentially spaced relation.

What is claimed is:
1. An air dryer device for drying compressed air which comprises:
   (a) a base member having an upper surface, an air inlet connectable to a source of compressed air, an air outlet connectable to an air tank, and a cavity communicating with said air inlet and having an upper end opening to said upper surface;
   (b) a housing mounted on said base member at a lower end thereof;
   (c) a drain passage provided in said base member and communicating to the ambient atmosphere;
   (d) a drain valve mounted on said base member for selectively communicating said cavity with said drain passage;
   (e) an air dryer disposed within said housing, said air dryer including an absorbent container of a synthetic resin holding an absorbent material and disposed in spaced relation to said housing to form a space therebetween which communicates with said air outlet of said base member, said container having a lower end wall seated on said upper surface of said base member to close said open upper end of said cavity, said container having a peripheral flange at a lower end thereof, said lower end wall and said flange defining a bottom of said container, said container having an air passage for communicating the interior of said container with said space, said container being provided with a check valve mounted in said air passage for allowing a flow of the air from the interior of said container to said space but preventing a flow of the air from said space to the interior of said container, and said container having a throttle passage for allowing the air to flow from said space to the interior of said container to regenerate the absorbent material therein;

(f) a plate embedded in said bottom of said container, another air passage being formed through said bottom to communicate said cavity with the interior of said container, (g) fastening elements passing through said flange and said plate into said base member to fasten said container to said base member.

2. An air dryer device according to claim 1, in which said plate is raised at a marginal portion thereof, said fastening element passing through said raised marginal portion.

3. An air dryer device according to claim 2, in which said marginal portion is exposed to the interior of said space.

4. An air dryer device according to claim 1, claim 2 or claim 3, in which said plate member is made of metal.

5. An air dryer device according to claim 1, in which said container having a side wall of which thickness is increasing progressively toward said lower end wall.

6. An air dryer device according to claim 1, in which said base member is recessed at a marginal portion of said upper surface thereof to form an annular recess, the lower end of said housing being seated on said recess.

* * * * *